(12) United States Patent
Fujiwara

(10) Patent No.: US 8,405,997 B2
(45) Date of Patent: Mar. 26, 2013

(54) ELECTRONIC APPARATUS

(75) Inventor: Nobuto Fujiwara, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/827,922

(22) Filed: Jun. 30, 2010

(65) Prior Publication Data

US 2010/0328878 A1 Dec. 30, 2010

(30) Foreign Application Priority Data

Jun. 30, 2009 (JP) ................................ 2009-156009

(51) Int. Cl.
*H05K 7/20* (2006.01)
*H05K 7/00* (2006.01)
*H05K 5/00* (2006.01)
*F28F 7/00* (2006.01)

(52) U.S. Cl. ........ 361/711; 361/704; 361/709; 361/717; 361/718; 361/719; 361/720; 361/679.46; 361/679.47; 361/679.48; 361/679.49; 361/679.54; 361/679.55; 165/80.2; 165/80.3; 174/15.2; 174/16.3

(58) Field of Classification Search ........ 361/679.46–679.55, 704, 709, 361/711, 717–720; 165/80.2–80.3; 174/15.2, 174/16.3
See application file for complete search history.

(56) References Cited

U.S. PATENT DOCUMENTS

| | | | | |
|---|---|---|---|---|
| 5,793,611 A | * | 8/1998 | Nakazato et al. | ............. 361/704 |
| 5,816,319 A | * | 10/1998 | Kamekawa et al. | ........... 165/121 |
| 6,141,215 A | * | 10/2000 | Podwalny et al. | ........ 361/679.47 |
| 6,166,906 A | * | 12/2000 | Sun et al. | ....................... 361/697 |
| 6,169,660 B1 | * | 1/2001 | Sarraf et al. | ................... 361/717 |
| 6,771,497 B2 | * | 8/2004 | Chang et al. | ............. 361/679.47 |
| 6,804,115 B2 | * | 10/2004 | Lai | ................................. 361/695 |
| 6,847,524 B2 | * | 1/2005 | Tomioka et al. | .............. 361/695 |
| 6,914,782 B2 | * | 7/2005 | Ku | ................................. 361/700 |
| 6,937,474 B2 | * | 8/2005 | Lee | ................................ 361/715 |
| 7,019,974 B2 | * | 3/2006 | Lee et al. | ....................... 361/700 |
| 7,079,394 B2 | * | 7/2006 | Mok | .............................. 361/700 |
| 7,131,487 B2 | * | 11/2006 | Chang et al. | ............. 165/104.33 |

(Continued)

FOREIGN PATENT DOCUMENTS

| | | |
|---|---|---|
| JP | 2000-349475 A | 12/2000 |
| JP | 2001-102787 | 4/2001 |

(Continued)

OTHER PUBLICATIONS

Notice of Reasons for Rejection mailed by Japan Patent Office on Dec. 14, 2010 in the corresponding Japanese patent application No. 2009-252699.

(Continued)

*Primary Examiner* — Bradley Thomas
(74) *Attorney, Agent, or Firm* — Knobbe, Martens, Olson & Bear LLP

(57) ABSTRACT

According to one embodiment, an electronic apparatus includes an enclosure, printed wiring board, electronic component, fan, duct, fin assembly, and heat pipe. The enclosure has an exhaust port in a sidewall thereof. The electronic component is mounted on the printed wiring board. The fan is placed in the vicinity of the exhaust port. The duct guides an airflow generated by the fan to the exhaust port. The fin assembly constituted of a plurality of fins, is arranged between an exit of the duct and the exhaust port, and includes an extension portion. A part of the extension portion extends to a range configured to overhang the printed wiring board.

8 Claims, 9 Drawing Sheets

U.S. PATENT DOCUMENTS

| | | | |
|---|---|---|---|
| 7,209,356 B2 * | 4/2007 | Lee et al. | 361/719 |
| 7,248,473 B2 * | 7/2007 | Ohnishi et al. | 361/695 |
| 7,325,590 B2 * | 2/2008 | Kim et al. | 165/104.33 |
| 7,327,576 B2 * | 2/2008 | Lee et al. | 361/719 |
| 7,345,874 B2 * | 3/2008 | Cheng et al. | 361/695 |
| 7,460,370 B2 * | 12/2008 | Cheng et al. | 361/700 |
| 7,477,515 B2 * | 1/2009 | Tsai et al. | 361/700 |
| 7,511,947 B2 * | 3/2009 | Leng et al. | 361/679.52 |
| 7,542,290 B2 * | 6/2009 | Tracy et al. | 361/696 |
| 7,551,443 B2 * | 6/2009 | Liu et al. | 361/700 |
| 7,589,965 B2 * | 9/2009 | Liang et al. | 361/695 |
| 7,656,665 B2 * | 2/2010 | Lin et al. | 361/700 |
| 7,855,889 B2 * | 12/2010 | Hung et al. | 361/700 |
| 2002/0039279 A1 * | 4/2002 | Ishikawa et al. | 361/687 |
| 2002/0181200 A1 * | 12/2002 | Chang | 361/687 |
| 2003/0081382 A1 * | 5/2003 | Lin | 361/697 |
| 2003/0151900 A1 * | 8/2003 | Ku | 361/719 |
| 2003/0161102 A1 * | 8/2003 | Lee et al. | 361/687 |
| 2004/0001316 A1 * | 1/2004 | Kamikawa et al. | 361/700 |
| 2004/0123978 A1 * | 7/2004 | Hashimoto et al. | 165/80.3 |
| 2005/0243520 A1 * | 11/2005 | Tomioka et al. | 361/702 |
| 2006/0162901 A1 * | 7/2006 | Aizono et al. | 165/80.4 |
| 2006/0181851 A1 * | 8/2006 | Frank et al. | 361/700 |
| 2006/0256520 A1 * | 11/2006 | Chen | 361/687 |
| 2007/0029071 A1 * | 2/2007 | Hwang et al. | 165/104.33 |
| 2007/0091578 A1 * | 4/2007 | Chang et al. | 361/719 |
| 2007/0146988 A1 * | 6/2007 | Yamagishi et al. | 361/687 |
| 2007/0171616 A1 * | 7/2007 | Peng et al. | 361/700 |
| 2007/0177350 A1 * | 8/2007 | Hata et al. | 361/697 |
| 2007/0195500 A1 * | 8/2007 | Cheng et al. | 361/697 |
| 2007/0251676 A1 * | 11/2007 | Cheng et al. | 165/104.33 |
| 2008/0007914 A1 * | 1/2008 | Peng et al. | 361/700 |
| 2008/0037227 A1 * | 2/2008 | Fujiwara | 361/722 |
| 2008/0043436 A1 * | 2/2008 | Hung et al. | 361/700 |
| 2008/0062649 A1 * | 3/2008 | Leng et al. | 361/700 |
| 2008/0105410 A1 * | 5/2008 | Hwang et al. | 165/104.33 |
| 2008/0112130 A1 * | 5/2008 | Nakamura | 361/687 |
| 2008/0123298 A1 * | 5/2008 | Takeguchi et al. | 361/702 |
| 2008/0298011 A1 * | 12/2008 | Hongo | 361/687 |
| 2008/0304231 A1 * | 12/2008 | Morino et al. | 361/687 |
| 2009/0040720 A1 * | 2/2009 | Tanaka et al. | 361/697 |
| 2009/0052131 A1 * | 2/2009 | Fujiwara | 361/695 |
| 2009/0129020 A1 | 5/2009 | Fujiwara | |
| 2009/0168331 A1 * | 7/2009 | Fujiwara | 361/679.47 |
| 2010/0186932 A1 * | 7/2010 | Chou | 165/104.34 |
| 2010/0259897 A1 * | 10/2010 | Min et al. | 361/700 |

FOREIGN PATENT DOCUMENTS

| | | |
|---|---|---|
| JP | 2001-119183 | 4/2001 |
| JP | 2008-078425 | 4/2008 |
| JP | 2008-198835 A | 8/2008 |
| JP | 2009-128947 A | 6/2009 |

OTHER PUBLICATIONS

Notice of Reasons for Rejection mailed on May 17, 2011 by Japan Patent Office in the corresponding Japanese patent application No. 2011-057035.

* cited by examiner

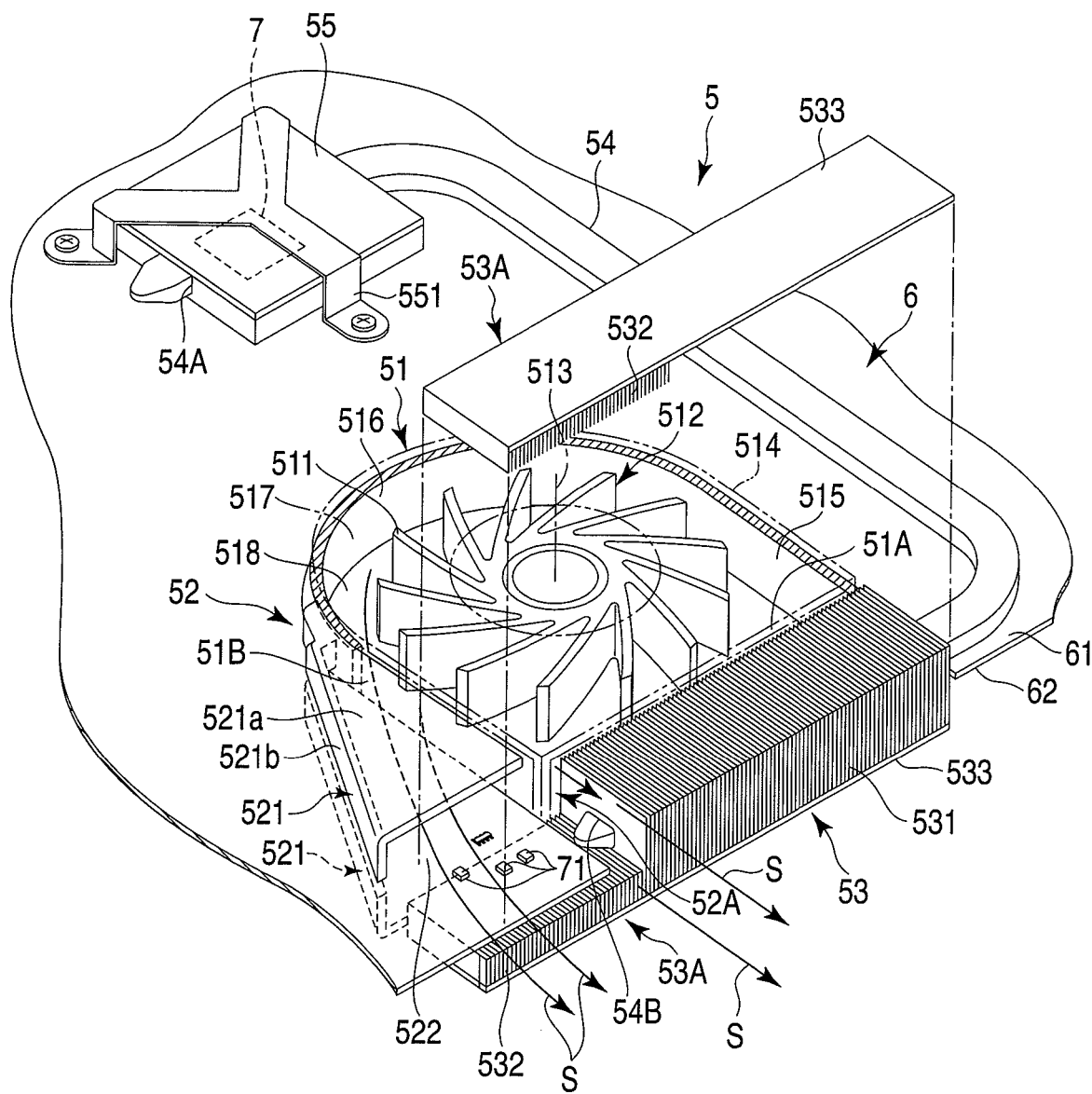
F I G. 2

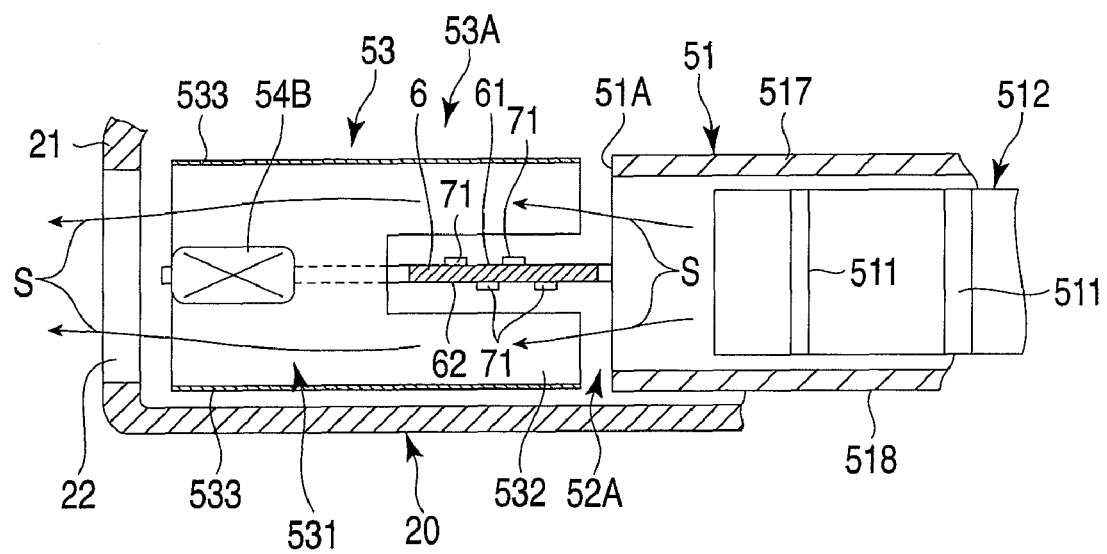
F I G. 10

ELECTRONIC APPARATUS

CROSS-REFERENCE TO RELATED APPLICATIONS

This application is based upon and claims the benefit of priority from Japanese Patent Application No. 2009-156009, filed Jun. 30, 2009; the entire contents of which are incorporated herein by reference.

FIELD

Embodiments described herein relate generally to an electronic apparatus in which a cooling device is arranged at a portion formed by cutting out portion of a printed wiring board.

BACKGROUND

There is a device in order to cool an electronic component mounted on a printed wiring board. This cooling device is constituted by being combined a heat sink and fan. The heat sink has a plurality of heat-radiation fins. A cooling device disclosed in Jpn. Appln. KOKAI Publication No. 2001-102787 has a plurality of dividing slits formed in a direction intersecting the heat-radiation fins, in order to enhance the cooling efficiency of the plurality of heat-radiation fins. The dividing slits formed in the heat sink of the cooling device have a length determined in such a manner that part of the heat-radiation fins which are not directly exposed to the flow of air generated by the rotation of a fan are not divided by the slits.

The printed wiring board is cut out in order to arrange a fan or fins of a cooling device inside an electronic apparatus in some cases. Hence, the mounting area of the printed wiring board is reduced by an area corresponding to the cut-out area. It becomes difficult to secure an area to be used to form a new circuit for higher performance and size reduction on the printed wiring board. Further, the heating value of electronic components has been increased with the trend toward higher density of the integrated circuit such as the ball grid array (BGA). It is necessary to employ a large fan or fin with a large heat-radiation area in order to enhance the capability of the cooling device.

BRIEF DESCRIPTION OF THE DRAWINGS

FIG. 2 is an exploded perspective view of a cooling device shown in FIG. 1;

FIG. 10 is a cross-sectional view of the cooling device in the vicinity of a fin assembly shown along line F10-F10 in FIG. 9.

DETAILED DESCRIPTION

In general, according to one embodiment, an electronic apparatus includes an enclosure, printed wiring board, electronic component, fan, duct, fin assembly, and heat pipe. The enclosure has an exhaust port in a sidewall thereof. The printed wiring board is stored in the enclosure. The electronic component is mounted on the printed wiring board, and generates heat by causing a current to flow through the component. The fan is arranged in the vicinity of the exhaust port, and blows air in the centrifugal direction of a rotation axis of a rotor. The duct surrounds an outer periphery of the fan, and guides an airflow generated by the fan to the exhaust port. The fin assembly constituted of a plurality of fins is arranged between an exit of the duct and the exhaust port. The fin assembly has an extension portion including a part extends to a range configured to overhang the printed wiring board. The heat pipe transmits heat generated in the electronic component to the fin assembly.

One embodiment described above provides an electronic apparatus with a cooling device which has cooling capacity enhanced without cutting out the printed wiring board additionally.

Various embodiments will be described hereinafter with reference to the accompanying drawings.

Figure 1:
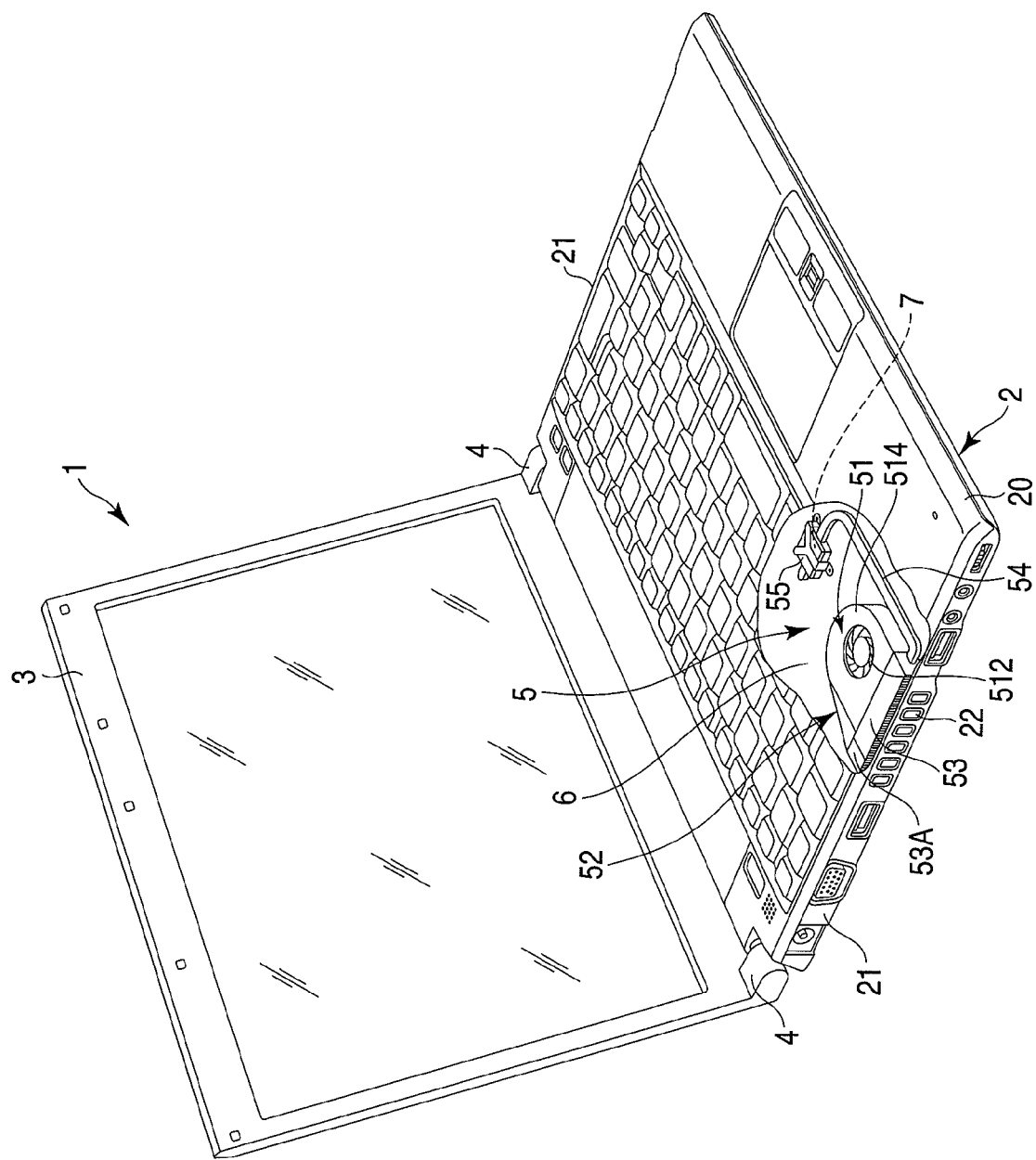
FIG. 1 is a perspective view showing an electronic apparatus of a first embodiment by partially cutting out the device.

An electronic apparatus 1 of a first embodiment will be described below with reference to FIGS. 1 to 3. The electronic apparatus 1 shown in FIG. 1 is a notebook portable computer, in which a display section 3 is coupled to a main body 2 by means of hinges 4. In this description, the near side viewed from the user side is called the "front", and the far side is called "rear". It is also defined "upper", "lower", "left", and "right" according to the user side respectively.

This electronic apparatus 1 is provided with an enclosure 20, printed wiring board 6, electronic component 7, fan 51, duct 52, fin assembly 53, and heat pipe 54. In FIG. 1, illustration is made so that the fan 51, duct 52, fin assembly 53, heat pipe 54, heat receptor 55, and printed wiring board 6 can be seen by partially cutting out a top surface of the main body 2. The enclosure 20 constitutes an outer shell of the main body 2, and has an exhaust port 22 in a left sidewall 21. The printed wiring board 6 is stored in the enclosure 20. Besides, the enclosure 20 incorporates therein a large-capacity storage medium, acoustic device, communication module, optical disk read/write unit, and the like, and equips various external connection terminals in the outer periphery thereof including the right and left sidewalls 21.

The electronic component 7 is mounted on the printed wiring board 6, and generates heat by internal circuit resistance when a current is made to flow through the component 7 during operation processing while the electronic apparatus 1 is used. There are the electronic component 7 generating heat, for example, a central processing unit (CPU), micro processing unit (MPU), graphics processing unit (GPU), and the like. The cooling device 5 is attached to each of the electronic components 7 heating values of which are large.

The cooling device 5 is constituted of a fan 51, duct 52, fin assembly 53, heat pipe 54, and heat receptor 55. The fan 51 is arranged in the vicinity of the exhaust port 22 as shown in FIG. 1. When the exhaust port 22 is arranged in the right sidewall 21 or back wall, the fan 51 is placed in the vicinity of the right sidewall 21 or back wall.

As shown in FIG. 2, the fan 51 is fitted in a portion formed by cutting out a part of the printed wiring board 6 closer to the exhaust port 22 in accordance with the external shape of a case 514. As shown in FIG. 3, the printed wiring board 6 is positioned at the middle of the height of the fan 51. The fan 51 has a rotor 512 to which a plurality of blades 511 are attached. The rotor 512 is rotated in the counterclockwise direction in FIG. 3. The fan 51 breathes air along the rotation axis of the rotor 512, and blows air in the centrifugal direction. The case 514 surrounding the rotor 512 forms a part of the duct 52.

An airflow S generated by the fan 51 flows along both the top surface and undersurface of the printed wiring board 6. Further, the rotor 512 of the fan 51 is positioned eccentric with respect to the center of the case 514. Since, it is desired to send more air to the exhaust port 22, the center of rotor 512 is positioned eccentric in a direction shifted by about 90 degrees in phase angle in the clockwise with respect to the exhaust port 22.

The duct 52 is constituted of the case 514 of the fan, and an expansion hood 521 as shown in FIG. 2. The duct 52 guides the airflow S generated by the fan 51 to the exhaust port 22. The case 514 is constituted of a sidewall 515, peripheral wall 516, upper wall 517, and lower wall 518. The sidewall 515 is an outer wall positioned on the downstream side of the exhaust port 22 in the rotational direction of the rotor 512 when it is assumed that the side on which the rotor 512 is made eccentric is the uppermost stream side. The peripheral wall 516 is positioned on the opposite side of the exhaust port 22 with the rotor positioned between them. The upper wall 517 and lower wall 518 each include an inlet port with a diameter smaller than that of the blades 511 of the rotor 512.

In this embodiment, a range between the exhaust port 22 and the peripheral wall 516, corresponding to the sidewall that becomes the outer wall on the upstream side of the exhaust port 22, is opened like the exhaust port 22. Thus, an opening on the exhaust port 22 side is defined as a main exit 51A, and opening on the upstream side of the main exit is defined as an upstream side exit 51B. It should be noted that an inlet port may be or may not be provided at a position in the bottom of the enclosure 20 corresponding to the position of the fan 51. Further, the main exit 51A and upstream side exit 51B may be continuously formed with each other as one part, or may be separated from each other by a support post used to maintain a distance between the upper wall 517 and lower wall 518.

The expansion hood 521 is attached to a peripheral part of the upstream side exit 51B, and guides the air discharged from the upstream side exit 51B to the exhaust port 22 side. In this case, the airflow S flowing out from the upstream side exit 51B is divided into two flows, i.e., an upper flow and lower flow by the printed wiring board 6 adjacent to the upstream side exit 51B. Accordingly, the expansion hood 521 shown in FIG. 3 is arranged by being divided into two parts, i.e., one part on the top surface side of the printed wiring board 6, and the other part on the undersurface side thereof.

Each of the expansion hoods 521 is separated a little from each of the top surface 61 and undersurface 62 of the printed wiring board 6 in order that each of the expansion parts 521 may not come into contact with the circuit formed on each of the top surface 61 and undersurface 62 of the printed wiring board 6. Even when an electronic component 7 larger than a distance by which the expansion hood 521 is separated from the printed wiring board 6 is mounted on the printed wiring board 6 in the range surrounded by the expansion hood 521, it is sufficient if the expansion hood 521 is not directly in contact with the electronic component 7. Further, in consideration of a case where the expansion hood 521 comes into contact with the electronic component 7, the expansion hood 521 is made of an insulating material. A sub-exit 522 of the expansion hood 521 is provided at a position substantially the same as the main exit 51A of the case 514. The main exit 51A constitutes an exit 52A of the duct 52 together with the sub-exit 522.

Figure 3:
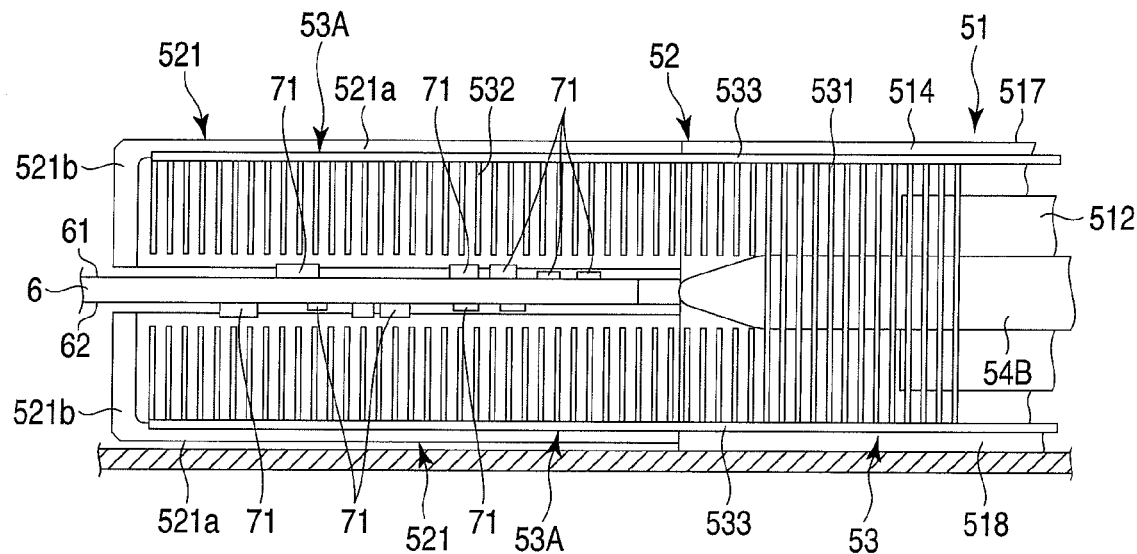
FIG. 3 is a front view of the cooling device shown in FIG. 1 viewed from the exhaust port side.

As shown in FIGS. 2 and 3, the fin assembly 53 is constituted of a plurality of first fins 531 and a plurality of second fins 532. Each of the first fin 531 and second fin 532 is made of a material excellent in thermal conductivity, such as copper, aluminum, or an alloy in which one of these metals is used as a base substance. The fin assembly 53 is arranged between the exit 52A of the duct 52 and exhaust port 22.

The fin assembly 53 includes an extension portion 53A having a part which extends to a range configured to overhang the printed wiring board 6. The extension portion 53A extends toward the printed wiring board 6 side in a direction intersecting the airflow S coming out from the fan 51. The extension portion 53A is arranged between the sub-exit 522 of the expansion hood 521, and exhaust port 22. The external shape of the fin assembly 53 configured as described above is formed into a shape having a slit into which the printed wiring board 6 is inserted when the fin assembly 53 is viewed as one block.

The first fins 531 and second fins 532 are arranged at substantially equal gaps in parallel with each other. The first fins 531 are arranged in crossing angle along in the thickness direction of the board 6. The first fins 531 are placed in a range between the main exit 51A of the fan 51 and exhaust port 22 in which the printed wiring board 6 is cut out, and are formed in substantially the same dimension as the height of the main exit 51A. The second fins 532 constitute the extension portion 53A, and are arranged at a height at which the fins 532 are prevented from coming into contact with the electronic components mounted on the printed wiring board 6 as shown in FIG. 3. The second fins 532 are provided on both the top surface 61 side and undersurface 62 side of the printed wiring board 6. Further, as shown in FIG. 2, the second fins 532 are coupled to the first fins 531 by thermal conductors 533 configured to bind the fin assembly 53 between them in the thickness direction of the printed wiring board 6.

The heat pipe 54 includes a heat-reception end 54A and heat-radiation end 54B as shown in FIG. 2. The heat-reception end 54A is attached to the heat receptor 55. The heat-radiation end 54B is fastened to the fin assembly 53. In this embodiment, the heat-radiation end 54B penetrates the first fins in a crossing direction of the first fins between the duct 52 and exhaust port 22 along the surface of the printed wiring board 6. That is, the heat-radiation end 54B of the heat pipe 54 is arranged over the range of the main exit 51A of the fan 51. Since the first fins 531 and second fins 532 are bound to each other by the thermal conductors 533 in the fin assembly 53, the heat released from the heat-radiation end 54B is transmitted from the first fins 531 to the second fins 532 through the thermal conductors 533. In order that the heat receptor 55 can be in close contact with the electronic component 7, the heat receptor 55 is fixed to the printed wiring board 6 by a fastener 551. Hence, the heat pipe 54 receives heat generated in the electronic component 7 from the heat-reception end 54A through the heat receptor 55, and radiates the heat from the entire fin assembly 53 attached to the heat-radiation end 54B.

The electronic apparatus 1 configured as described above has the extension portion 53A of the fin assembly 53 extended to overhang a part of the printed wiring board 6 in addition to the part between the main exit 51A of the fan 51 and exhaust port 22 of the enclosure 20. Further, the airflow S of the fan 51 is guided to the extension portion 53A by the expansion hood 521 constituting the duct 52. That is, this cooling device 5 is larger in heat-radiation area, and is higher in cooling capacity by an amount corresponding to the extension portion 53A than a cooling device in which a fin assembly is placed only between the main exit 51A and exhaust port 22. The extension portion 53A is extended to overhang the printed wiring board 6, and the printed wiring board 6 is not additionally cut out. Therefore, it is possible to improve the cooling capacity of the electronic apparatus 1 provided with the cooling device 5 while keeping the mounting area of the electronic component 7 on the printed wiring board 6.

Further, as shown in FIGS. 2 and 3, the extension portion 53A is apart from both the top surface 61 and undersurface 62 of the printed wiring board 6 to be inserted in the slit-like part of the extension portion 53A. Thus, it is possible to form a circuit by arranging a surface mounting component 71 when it is small enough for the electronic component 7 on the inserted part of the printed wiring board 6. Likewise, it is possible to form a circuit on both the top surface 61 and undersurface 62 of the printed wiring board 6 in the range surrounded by the expansion hood 521 of the duct 52. That is, in the electronic apparatus, it is possible to increase the cooling capacity of the cooling device 5 without reducing the mounting area on the printed wiring board 6.

Other embodiments will be described below. In this case, the configuration including the same function as the first embodiment is denoted by the same reference symbol as the first embodiment in each drawing, and a detailed description thereof is omitted. As for the omitted description, the part of the corresponding description of the electronic apparatus 1 of the first embodiment is to be referred to.

Figure 4:
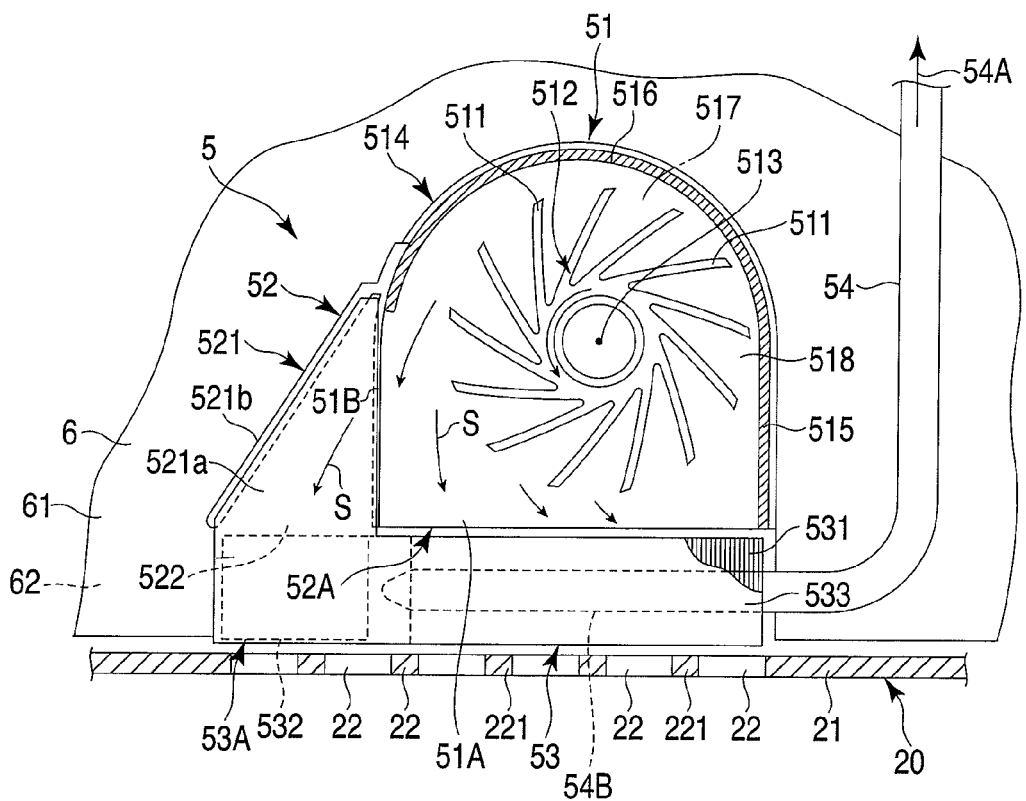
FIG. 4 is a plan view showing a cooling device of an electronic apparatus of a second embodiment.

An electronic apparatus 1 of a second embodiment will be described below with reference to FIG. 4. In FIG. 4, a fan 51, duct 52, fin assembly 53, and heat-radiation end 54B of a heat pipe 54 all of which belong to a cooling device 5 of the electronic apparatus 1 are shown. FIG. 4 shows the cooling device 5, in order to visualize a rotor 512 of a fan 51, and first fins 531, by partially cutting out a case 514 and thermal conductor 533. In the electronic apparatus 1 of this embodiment, the thermal conductors 533 configured to bind first fins 531 and second fins 532 to each other constitute parts of a duct 52.

More specifically, a part of the thermal conductor 533 on the extension portion 53A side extends to an upstream side exit 51B as shown in FIG. 4. Hence, the thermal conductor 533 on the top surface 61 side of the printed wiring board 6 constitutes a cover panel 521a of an expansion hood 521 arranged on the top surface 61 side, and thermal conductor 533 on the undersurface 62 side of the printed wiring board 6 constitutes a cover panel 521a of an expansion hood 521 arranged on the undersurface 62 side.

The electronic apparatus 1 configured as described above obtains the same advantage as the first embodiment. Besides, the heat-radiation area of the cooling device 5 is further extended, the cooling capacity of the cooling device 5 is increased. Further, the part of the printed wiring board 6 covered with the extension portion 53A and duct 52 is easily made visible by only removing the fin assembly 53. In place of extending the thermal conductors 533, insulating protective members attached to outside the thermal conductors 533 from above and below the fin assembly 53 may be extended to the expansion hood 521 side.

Figure 5:
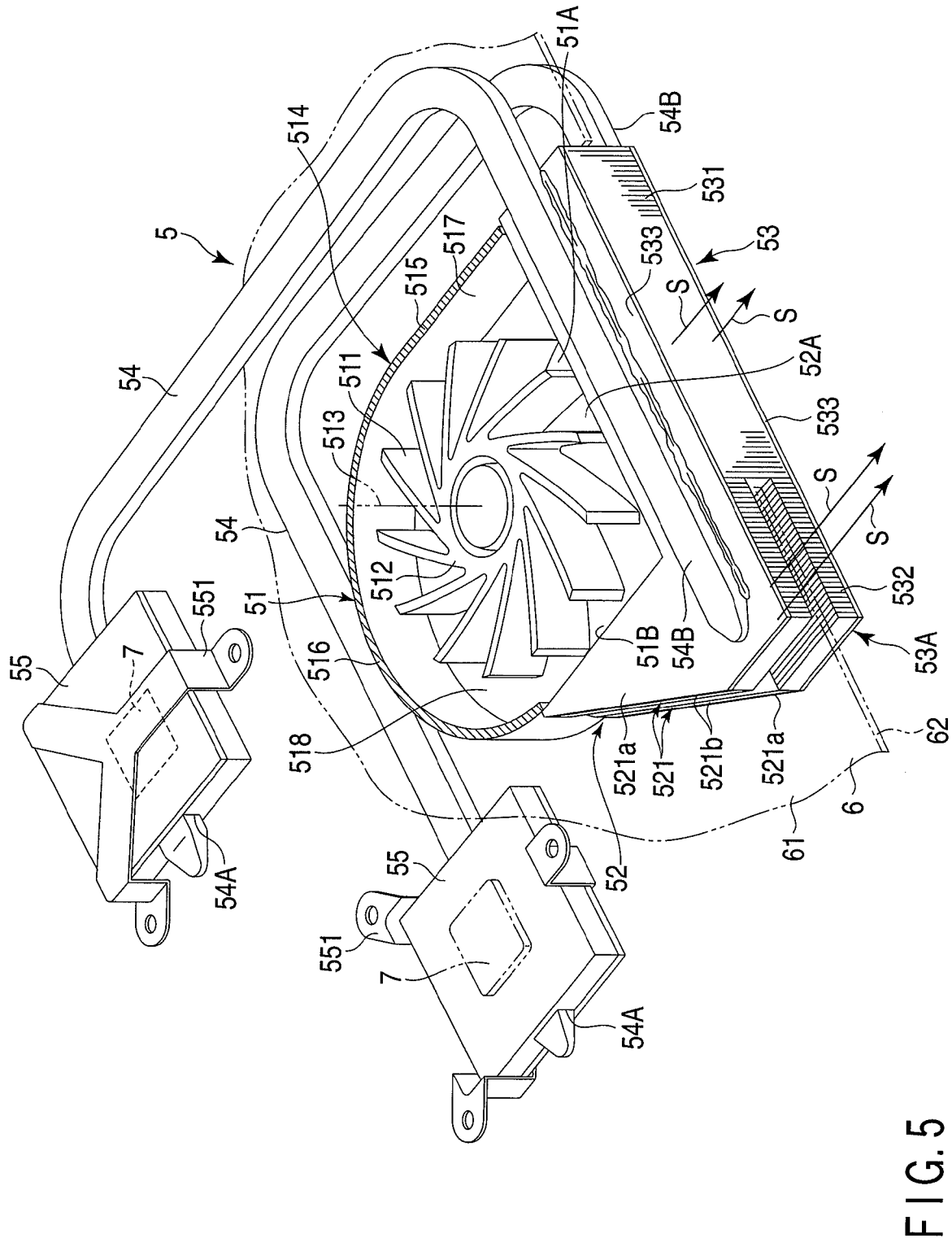
FIG. 5 is a perspective view showing a cooling device of an electronic apparatus of a third embodiment.

An electronic apparatus 1 of a third embodiment will be described below with reference to FIG. 5. In FIG. 5, the cooling device 5 of the electronic apparatus 1 is shown. FIG. 5 shows the cooling device 5 by removing a superior wall 517 of a case 514 in order to visualize a rotor 512 of a fan 51. As shown in FIG. 5, in the cooling device 5, two heat pipes 54 are connected to a fin assembly 53. A heat-reception end 54A of each of the heat pipes 54 is fastened to each of two different electronic components 7, which are mounted on the printed wiring board 6 and are necessary to cool, by a heat receptor 55. A heat-radiation end 54B of each of the heat pipes 54 is fastened, by brazing, to each of thermal conductors 533 configured to join first fins 531 and second fins 532 to each other.

A distal end of the heat-radiation end 54B extends to a part of the thermal conductor 533 in the range of an extension portion 53A to which second fins 532 are attached. The heat pipes 54 transmit heat generated from different electronic components 7 to one fin assembly 53. The heat-radiation end 54B extends to the extension portion 53A, and the heat is directly transmitted to the second fins 532 of the extension portion 53A. Therefore the cooling capacity of the cooling device 5 is increased.

Further, the thermal conductor 533 constitutes part of a duct 52 like in the second embodiment. In this embodiment, the duct 52 is constituted by the case 514 and expansion hood 521. The part corresponding to the expansion hood 521 is all formed of a member obtained by extending the thermal conductor 533. That is, in this embodiment, a cover panel 521a arranged substantially in parallel with the top surface 61 or undersurface 62 of the printed wiring board 6, and outer sidewall 521b provided perpendicular to the printed wiring board 6 are formed of one continuous thermal conductor 533. The outer sidewall 521 may be formed by extending a second fin 532 arranged on the distal end of the extension portion 53A. In either case, when the thermal conductor 533 is constituted of a conductive member, a short circuit is prevented from occurring by attaching an insulating member to the edge of the conductor 533 on the printed wiring board 6 side, or inserting the insulating member between the conductor 533 and printed wiring board 6.

In the cooling device 5 of the electronic apparatus 1 configured as described above, the number of parts is reduced. Since, the extension portion 53A of the fin assembly 53 of the cooling device 5, and expansion hood 521 of the duct 52 are continuously formed integral with the fin assembly 53, the working efficiency is improved in the assembling operation of the cooling device 5 into the electronic apparatus 1.

Instead of forming the part corresponding to the expansion hood 521 integral with the thermal conductor 533 of the fin assembly 53, the expansion hood 521 may be separately provided like in the electronic apparatus 1 of the first embodiment, and in the electronic apparatus 1 of the second embodiment. Further, in this embodiment, the electronic component 7 to be cooled is arranged on each of the top surface 61 and undersurface 62 of the printed wiring board 6. When the electronic components 7 to be cooled are arranged on the same surface, i.e., on the top surface 61 or on the undersurface 62, the heat pipe 54 attached to the thermal conductor 533 on the opposite side of the electronic-component 7 mounting side is arranged by detouring the heat pipe 54 through the outer periphery of the printed wiring board 6 so that the heat-reception end 54A thereof can be fixed to the corresponding electronic component 7.

Furthermore, in this embodiment, the heat-radiation end 54B of the heat pipe 54 is arranged along the range in which the first fins 531 and second fins 532 are arranged. Therefore, the first fins 531 and second fins 532 may be directly attached to the heat-radiation end 54B of the heat pipe 54 by brazing or the like. In this case, the thermal conductor 533 is not always necessary.

Further, in this embodiment, the heat pipe 54 is attached to each of the thermal conductors 533 on both the upper side and lower side of the fin assembly 53. When there is only one electronic component 7 to be cooled by this cooling device 5, it is sufficient that one heat pipe is attached to the thermal conductor 533 on the same side as the surface of the printed wiring board 6 on which the electronic component 7 of interest is arranged. Heat generated from the electronic component 7 is transmitted to the second fins 532 on the opposite side of the heat pipe 54 mounting side from the heat-radiation end 54B of the heat pipe 54 through the thermal conductor 533, first fins 531, and thermal conductor 533 on the opposite side, and is radiated also from the second fins 532.

Figure 6:
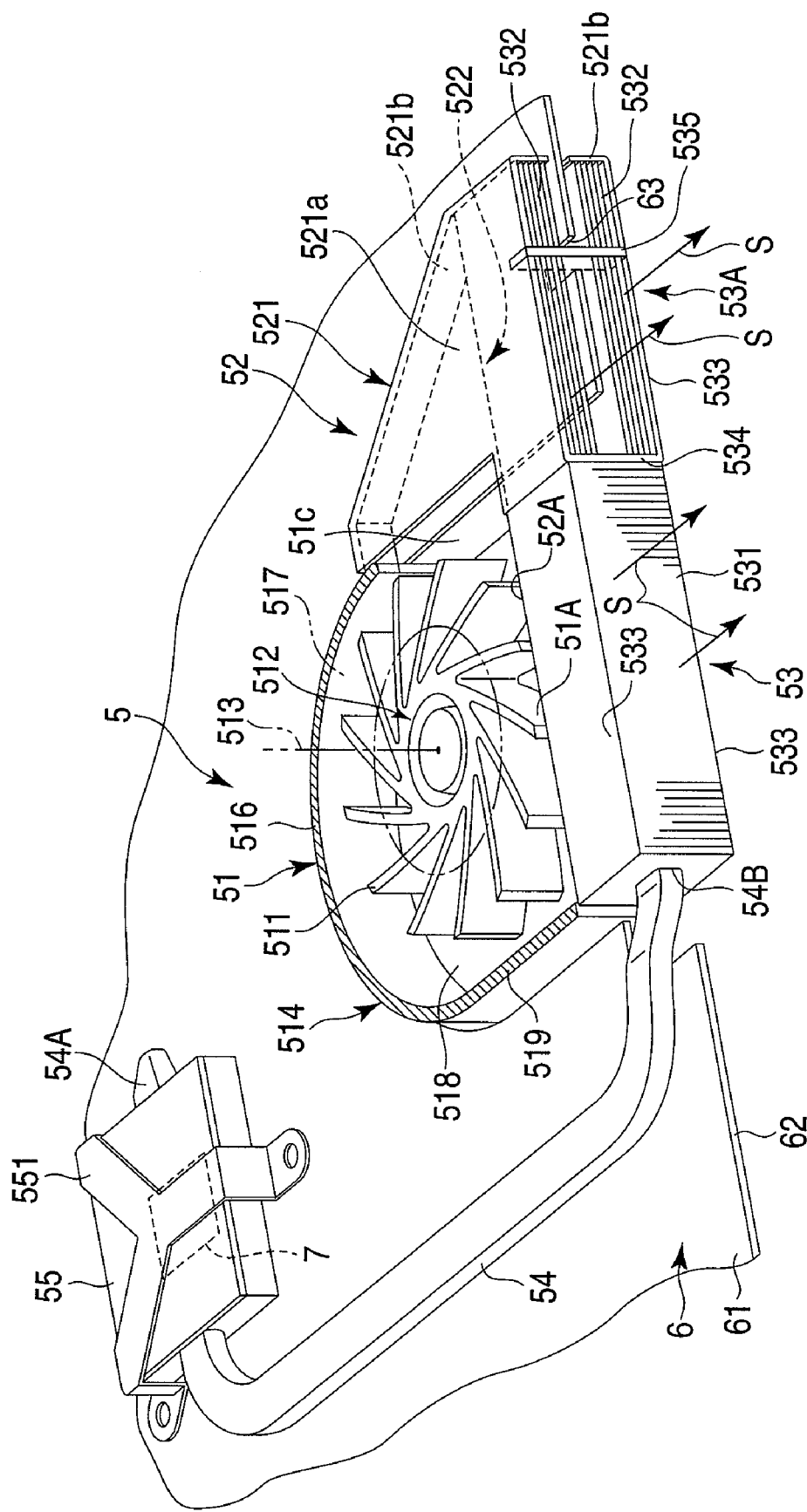
FIG. 6 is a perspective view showing a cooling device of an electronic apparatus of a fourth embodiment.
Figure 7:
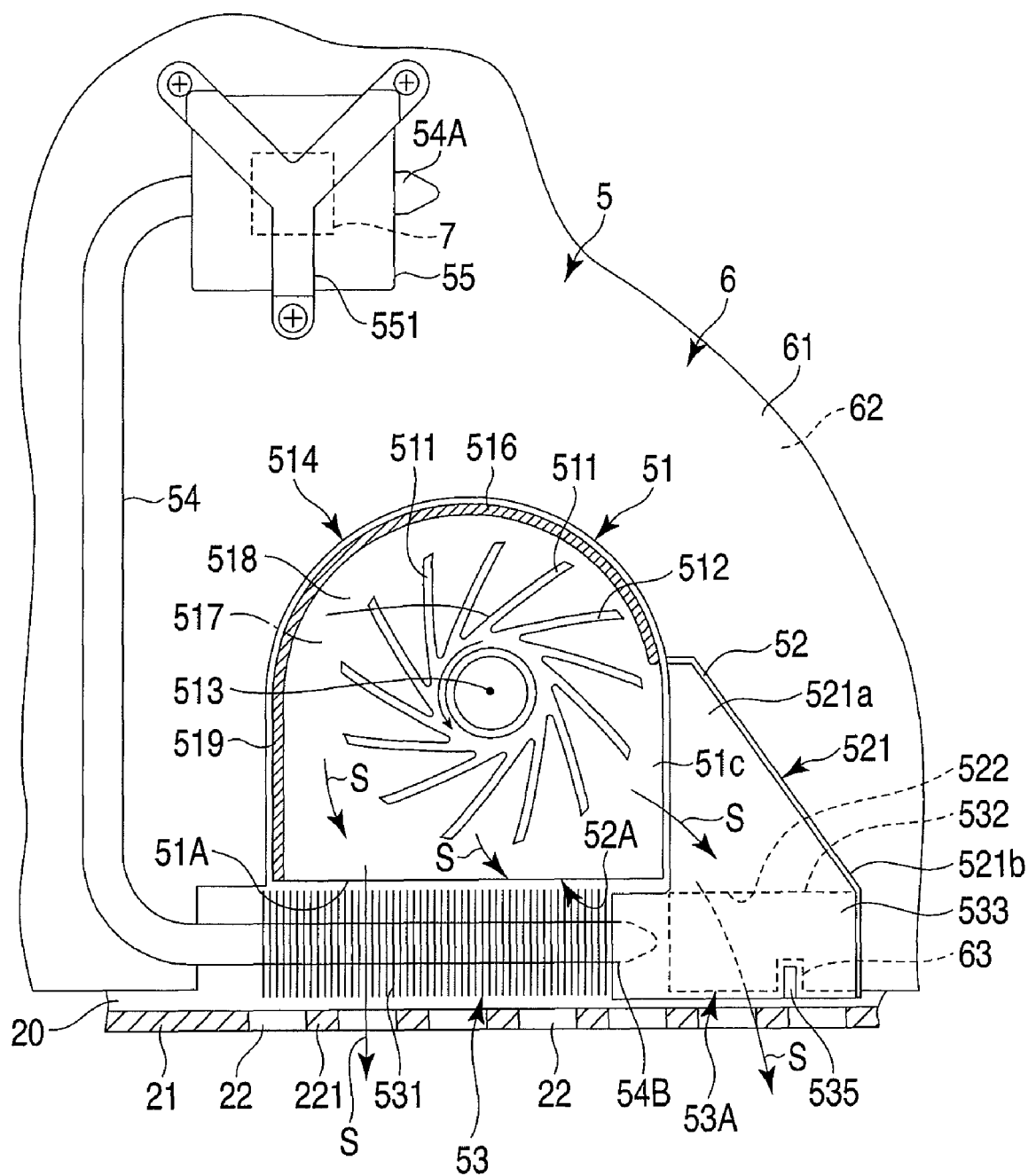
FIG. 7 is a plan view of the cooling device shown in FIG. 6.

An electronic apparatus 1 of a fourth embodiment will be described below with reference to FIGS. 6 and 7. In FIG. 6, a cooling device 5 of the electronic apparatus 1 is shown. FIGS. 6 and 7 show the cooling device 5 by removing a superior wall 517 of a case 514 in order to visualize a rotor 512 of a fan 51. This cooling device 5 differs from those of the cases of the electronic apparatuses of the first to third embodiments in the position at which an extension portion 53A of a fin assembly 53 is provided. In this embodiment, the extension portion 53A is arranged on the downstream side of a main exit 51A in the rotational direction of the rotor 512 as shown in FIGS. 6 and 7. Accordingly, in the case 514, a downstream side exit 51C is provided at a downstream portion of the exhaust port 22 corresponding to the sidewall 515 of the first embodiment, and the portion which is the upstream side exit 51B of the first embodiment is closed by a sidewall 519 on the upstream side.

The expansion hood 521 at the downstream side exit 51C is formed by a part of the extension portion 53A of each thermal conductor 533 which binds the fin assembly 53 from above and below. The expansion hood 521 is extended to the vicinity of the downstream side exit 51C, like the expansion hood 521 of the electronic apparatus 1 of the third embodiment. In this embodiment, a cover panel 521a arranged parallel with a printed wiring board 6, and outer sidewall 521b arranged perpendicular to the printed wiring board 6 are formed of one continuous thermal conductor 533 as in the third embodiment.

The direction of second fins 532 constituting the extension portion 53A in this embodiment differs from the case of the electronic apparatus 1 in each of the first to third embodiments. As shown in FIG. 6, the second fins 532 are arranged in a direction parallel with the printed wiring board 6. A plurality of the second fins 532 are prepared, and are arranged in the thickness direction of the printed wiring board at substantially equal gaps. The second fins 532 are attached to a base 534 with thermal conductivity placed at a boundary between first fins 531 and the second fins 532. The base 534 may be formed integral with thermal conductors 533 to be attached to the second fins 532 from above and below the fins 532. Further, the second fins 532 are formed into substantially the same width as the first fins 531 between an exit 52A of a duct 52 and exhaust port 22 as shown in FIG. 7.

As shown in FIG. 6, the second fins 532 are connected to each other by a stem 535 in the thickness direction of the printed wiring board 6 at a position other than the base 534. Thus, the second fins 532 are each maintained in equal gaps, and are held not to be in contact with a circuit formed on the printed wiring board 6. In this case, the stem 535 is arranged to coincide with one of vertical bars 221 arranged between openings of the exhaust port 22 in order that the stem 535 may not disturb the airflow S of the fan 51. Further, a notch 63 is formed in the printed wiring board 6 at a position corresponding to the stem 535.

The thermal conductors 533 to be attached to the first fins 531 from above and below the fins 531 may be formed integral with the second fins 532 by using the same material as that for the uppermost second fin 532. The thermal conductors 533 to be attached to the first fins 531, and base 534 may be constituted of one continuous member. The second fins 532 may be extended to the vicinity of the downstream side exit 51C in parallel with the cover panel 521a.

The cooling device 5 of the electronic apparatus 1 configured as described above obtains the same advantage as the first embodiment. Further, the extension portion 53A of the fin assembly 53 is arranged on the downstream side of the first fins 531 arranged between the main exit 51A of the fan 51 and exhaust port 22 in the rotational direction of the rotor 512. Since, the second fins 532 are arranged in parallel with the printed wiring board 6, the air resistance of the second fins 532 to the airflow S sent from the fan 51 is small. Hence, although the extension portion 53A is provided on the downstream side of the main exit 51A, the flow of the air discharged from the fan 51 is fluent, and the cooling capacity of the cooling device 5 is increased.

Figure 8:
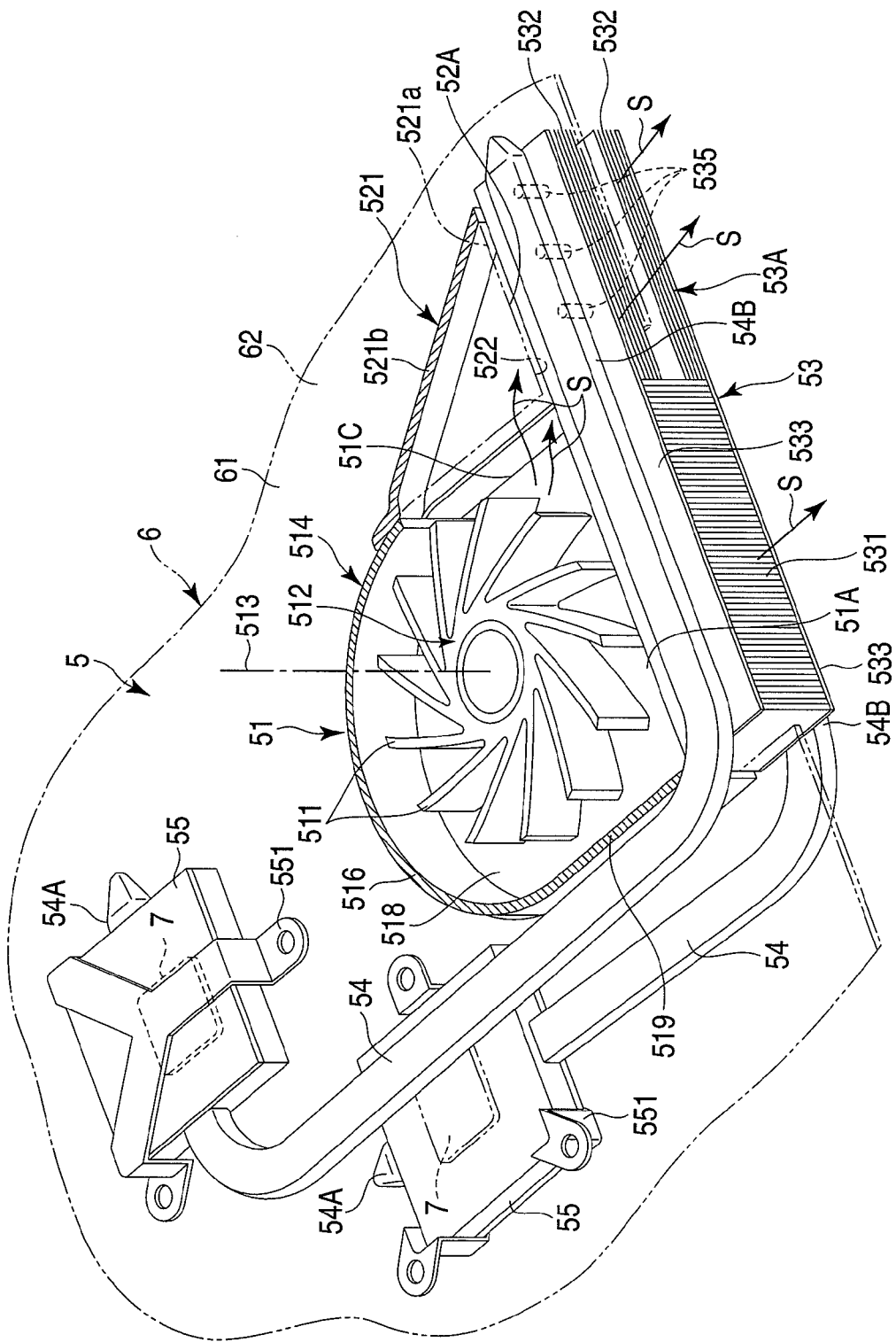
FIG. 8 is a perspective view showing a cooling device of an electronic apparatus of a fifth embodiment.

An electronic apparatus 1 of a fifth embodiment will be described below with reference to FIG. 8. In a cooling device 5 of the electronic apparatus 1 shown in FIG. 8, like in the cooling device 5 of the electronic apparatus 1 of the fourth embodiment, an extension portion 53A of a fin assembly 53 is arranged on the downstream side of a main exit 51A of a fan 51 in the rotational direction of a rotor 512. FIG. 8 shows the cooling device 5 by removing the upper wall 517 of the fan 51, and the cover panel 521a of the expansion hood 521. Thermal conductors 533 with the same width as the first fins 531 and second fins 532 are attached to the top surface and undersurface of the fin assembly 53. An expansion hood 521 identical with that of the first embodiment is attached to a downstream side exit 51C positioned on the downstream side of the main exit 51A in the rotational direction of the rotor 512.

Heat-radiation ends 54B of heat pipes 54 are attached to the thermal conductors 533 of the top surface and undersurface of the fin assembly 53 by brazing. A method other than brazing may be employed if heat can be transmitted from the heat pipe 54 to the thermal conductor 533. A heat-reception end 54A of the heat pipe 54 brazed to the top surface of the fin assembly 53 is fastened to an electronic component 7 mounted on the top surface 61 of a printed wiring board 6. A heat-reception end 54A of the heat pipe 54 brazed to the undersurface of the fin assembly 53 is fastened to an electronic component 7 mounted on the undersurface 62 of the printed wiring board 6. A distal end of the heat-radiation end 54B extends to an extension portion 53A constituted of the second fins 532. The second fins 532 arranged in parallel with the printed wiring board 6 in a layered form are joined to each other by stems 535 with thermal conductivity. The stem 535 extends from the heat-radiation end 54B to this side of the printed wiring board 6 by penetrating the second fins 532 in the thickness direction of the printed wiring board 6.

The cooling device 5 of the electronic apparatus 1 configured as described above is provided with the extension portion 53A of the fin assembly 53 without additionally cutting out the printed wiring board 6. Further, the heat-radiation end 54B of the heat pipe 54 extends to the extension portion 53A. Further, the second fins 532 are coupled to each other by the stems 535 extending from the heat-radiation end 54B. Since there are expansion hoods 521, the airflow S is also sent from the fan 51 to the extension portion 53A. Hence, the cooling device 5 radiates heat from the whole area of the first fins 531 and second fins 532 efficiently. It is possible to improve the cooling capacity of the cooling device 5 included in the electronic apparatus 1 in this embodiment, without reducing the mounting area on the printed wiring board 6, as well as the first embodiment, and also the other embodiments.

Figure 9:
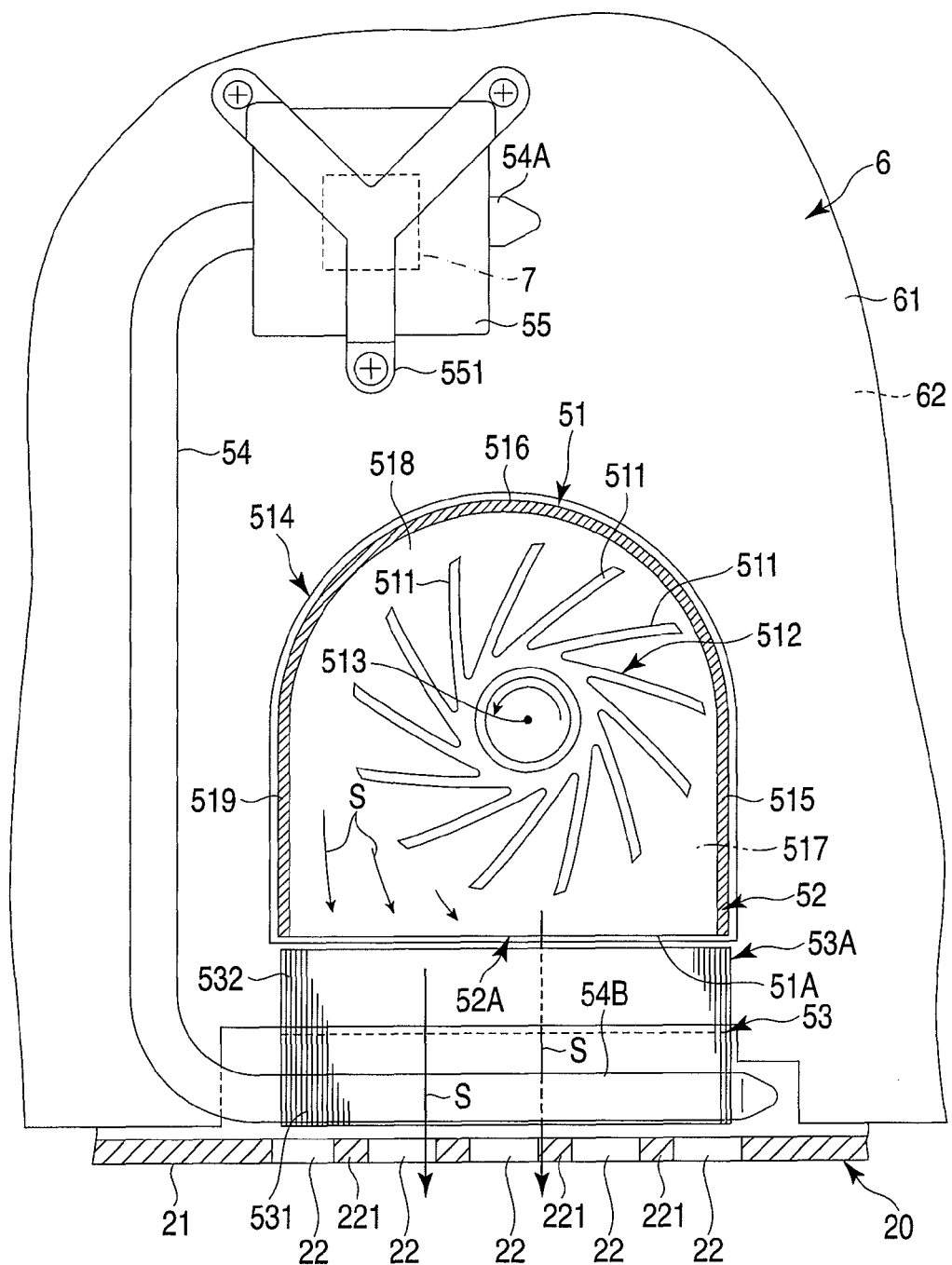
FIG. 9 is a plan view showing a cooling device of an electronic apparatus of a sixth embodiment.

An electronic apparatus 1 of a sixth embodiment will be described below with reference to FIGS. 9 and 10. In a cooling device 5 of the electronic apparatus 1 shown in FIG. 9, a fan 51 is placed at a little inner position from the exhaust port 22 than in the case of the first embodiment. FIG. 9 shows the cooling device 5 by removing a superior wall 517 of a case 514 in order to visualize a rotor 512 of a fan 51. The fan 51 includes neither an upstream side exit nor a downstream side exit unlike in the other embodiments. Therefore portions corresponding to these are closed by sidewall s 515 and 519, and the fan 51 is surrounded by a printed wiring board 6 as shown in FIG. 9. In other words, a region between a main exit 51A of the fan 51 serving as an exit 52A of a duct 52, and exhaust port 22 is intersected by the printed wiring board 6.

The fin assembly 53 is arranged between the main exit 51A of the fan 51 and exhaust port 22. An extension portion 53A of the fin assembly 53 extends to overhang the printed wiring board 6 side intersecting the region between the main exit 51A of the fan 51 and exhaust port 22 as shown in FIG. 10. A heat-radiation end 54B of a heat pipe 54 extends along the same plane as the printed wiring board 6, and adjacently to the exhaust port 22. Therefore the heat pipe 54 penetrates a part of the edge of the first fins 531 closer to the exhaust port 22 as shown in FIG. 10.

Further, the first fins 531 and second fins 532 to be arranged on the same plane each are formed continuous in this embodiment as shown in FIG. 10. That is, in the fin assembly 53, each of the fins is cut out to form an extension portion 53A overhanging the printed wiring board 6. Since each of the first fins 531 and second fins 532 are formed of one sheet, thermal conductors 533 may be attached to the top surface and undersurface of the fin assembly 53 as shown in FIG. 10 or may not be attached as shown in FIG. 9. The air entering from the second fin 532 side of the fin assembly 53 flows to the first fin 531 side without getting out upwardly or downwardly, and comes out from the exhaust port 22, when the thermal conductors 533 are attached to the fin assembly 53. Therefore, the cooling capacity as the cooling device 5 becomes stable.

Further, as shown in FIG. 10, the extension portion 53A of the fin assembly 53 of the cooling device 5 is a little separate from both the top surface 61 and undersurface 62 of the printed wiring board 6. Accordingly, like in the other embodiments, it is possible to mount a surface mounting component 71 which is an electronic component 7 on both the top surface 61 and undersurface 62 of the printed wiring board 6 in the range in which the extension portion 53A overhangs the printed wiring board 6, and to form a circuit. As described above, the cooling capacity of the cooling device 5 in the electronic apparatus 1 of this embodiment is increased by an amount corresponding to the extension of the extension portion 53A above the printed wiring board 6.

In the sixth embodiment, the region of the printed wiring board 6 configured to be across an area between the main exit 51A of the fan 51 and exhaust port 22 is positioned close to the main exit 51A of the fan 51. When the printed wiring board 6 between the main exit 51A and the exhaust port 22 is placed closer to the exhaust port 22, it is also possible to arrange the heat-radiation end 54B of the heat pipe 54 closer to the main exit 51A which is on the upstream side of the airflow S.

As described above, according to the electronic apparatus 1 of the first to sixth embodiments, it is possible to enhance the cooling capability of the cooling device 5 without extending the cut-out part of the printed wiring board 6.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
an enclosure comprising an exhaust port;
a printed wiring board in the enclosure, the printed wiring board comprising a first surface, and a second surface opposite to the first surface;
an electronic component on the printed wiring board, the electronic component configured to generate heat;
a fan configured to generate airflow in an outward direction with respect to a rotation axis of a rotor;
a case around an outer periphery of the fan;
a guide placed outside of the case in a radial direction with respect to the rotation axis of the rotor and configured to guide the airflow to the exhaust port;
a fin assembly between the guide and the exhaust port, the fin assembly comprising:
a first plurality of fins, not overlapping with the printed wiring board, each of the first fins situated in an intersecting angle with the printed wiring board; and
a second plurality of fins forming an extension portion overlapping with both surfaces of the printed wiring board;
a plurality of thermal conductors configured to connect both of two ends of the first fins in parallel with the printed wiring board, and to couple the first fins and second fins to each other; and
a heat pipe configured to transmit heat from the electronic component to the fin assembly.

2. The electronic apparatus of claim 1, wherein the extension portion is in a direction intersecting the airflow from the fan, along both the first and second surfaces of the printed wiring board.

3. The electronic apparatus of claim 1, wherein the extension portion is across an area between an exit of the guide and the exhaust port, along both the first and second surfaces of the printed wiring board.

4. The electronic apparatus of claim 1, wherein:
the extension portion is configured to be externally supported by at least one of thermal conductors, and
the printed wiring board situates between the second fins with a gap separating the electronic component from the extension portion.

5. The electronic apparatus of claim 1, wherein each of the second fins is in parallel with the each of first fins.

6. The electronic apparatus of claim 1, wherein each of the second fins is substantially in parallel with each of the surfaces of the printed wiring board.

7. The electronic apparatus of claim 1, wherein the thermal conductors are a portion of the guide.

8. The electronic apparatus of claim 1, wherein the heat pipe is pierces through the first fins on the same plane of the printed wiring board.

* * * * *